United States Patent
Bergeon

(10) Patent No.: US 6,546,302 B1
(45) Date of Patent: Apr. 8, 2003

(54) METHOD FOR SCHEDULING AND SEQUENCING VEHICLES FOR MANUFACTURE

(75) Inventor: Sharon Bergeon, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/543,724

(22) Filed: Apr. 5, 2000

(51) Int. Cl.[7] .......................... G06F 19/00; G06F 17/60
(52) U.S. Cl. ...................... 700/101; 700/100; 700/102; 705/8
(58) Field of Search .................... 700/99–103; 705/8

(56) References Cited

U.S. PATENT DOCUMENTS

| | | | | |
|---|---|---|---|---|
| 4,931,944 A | * | 6/1990 | Richter et al. ............... 264/300 |
| 5,202,836 A | * | 4/1993 | Iida et al. .................... 700/101 |
| 5,305,198 A | * | 4/1994 | Schroder et al. ............. 187/380 |
| 5,444,632 A | * | 8/1995 | Kline et al. .................. 700/100 |
| 5,983,195 A | * | 11/1999 | Fierro .......................... 700/100 |
| 6,141,598 A | * | 10/2000 | Nam ............................. 700/95 |
| 6,243,612 B1 | * | 6/2001 | Rippenhagen et al. ....... 700/100 |

\* cited by examiner

Primary Examiner—Leo Picard
Assistant Examiner—Elliot Frank
(74) Attorney, Agent, or Firm—David B. Kelley

(57) ABSTRACT

A method for sequencing and scheduling vehicles for manufacture. The method considers the characteristics, options, and/or accessories of the vehicles to be manufactured and determines the most efficient schedule or sequence in which the vehicles may be assembled or built.

11 Claims, 2 Drawing Sheets

METHOD FOR SCHEDULING AND SEQUENCING VEHICLES FOR MANUFACTURE

FIELD OF THE INVENTION

This invention generally relates to a method for vehicle scheduling and sequencing and more particularly, to a method for scheduling and sequencing automotive vehicles for manufacture.

BACKGROUND OF THE INVENTION

Automotive vehicles are typically manufactured or assembled in a sequential or "assembly line" process or procedure. The procedures performed in this assembly and/or manufacturing process are dependent upon the characteristics, options and accessories of the vehicles being produced. Particularly, different and/or additional procedures must be performed based upon customer demands and orders for particular vehicle characteristics, options, and accessories (e.g., paint colors, spoilers, moon-roofs, power seats, power windows, and other characteristics, options and accessories). As a result of fluctuating consumer and dealer demands and a limited number of available manufacturing facilities and time, vehicles having different characteristics, options and accessories are often assembled within the same location, facility or plant, and within the same assembly line.

Because of the varying steps required to manufacture vehicles having different characteristics and/or accessories, it is sometimes beneficial (e.g., reducing direct labor, parts inventories, and paint costs, while increasing equipment and floor space utilization) to assemble "similar" vehicles (e.g., cars having similar characteristics, options and accessories) in relatively close proximity to one another in order of sequence, and other times these similar vehicles should be spaced at the maximum distance apart. For example and without limitation, vehicles of the same color are typically sequenced, arranged or grouped close together in the assembly procedure in order to reduce the switching of paint colors in paint booths. For assembly of accessories requiring extra labor or equipment availability (i.e., moon-roofs and cellular telephones), it is desirable to maximize the distance between vehicles with the same accessories or characteristics. Finally, for certain vehicle characteristics (i.e., identical body and paint characteristics), it is sometimes desirable to fix the distance between vehicles with the same characteristics. Due to the relatively wide variety of vehicle characteristics, options, and accessories, the scheduling and "sequencing" of vehicles for manufacture is often relatively difficult to achieve in an efficient manner. As a result, manufacturing and production delays may occur which undesirably increase the overall time and cost of vehicle production.

There is therefore a need for a method for scheduling and sequencing vehicles for manufacture which allows vehicles to be assembled in an efficient manner.

SUMMARY OF THE INVENTION

It is a first object of the invention to provide a method for scheduling and sequencing vehicles for manufacture which allows vehicles to be assembled in an efficient manner.

It is a second object of the invention to provide a method for scheduling and sequencing vehicles for manufacture which ensures that vehicles having similar characteristics, options and accessories are assembled in relative close proximity to one another in order of sequence for certain characteristics, options and accessories and at a maximum or fixed distance for other characteristics, options and accessories.

It is a third object of the invention to provide a method for scheduling the manufacture of vehicles having a relatively wide variety of characteristics, options and accessories.

According to a first aspect of the present invention, a method is provided for arranging vehicles in an assembly sequence. The method includes the steps of receiving customer vehicle orders; assigning a complexity value to each of said received customer vehicle orders; selecting a lost customer vehicle order having a highest assigned complexity value; selecting a first rotation position within said assembly sequence; assigning said first customer vehicle order to said first rotation position; selecting a second customer vehicle order having a second highest assigned complexity value; computing a plurality of penalty values for said second customer vehicle order in a plurality of unassigned rotation positions within said sequence; selecting a second rotation position within said assembly sequence having a lowest penalty value for said second customer vehicle order; and assigning said second customer vehicle order to said second rotation position.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
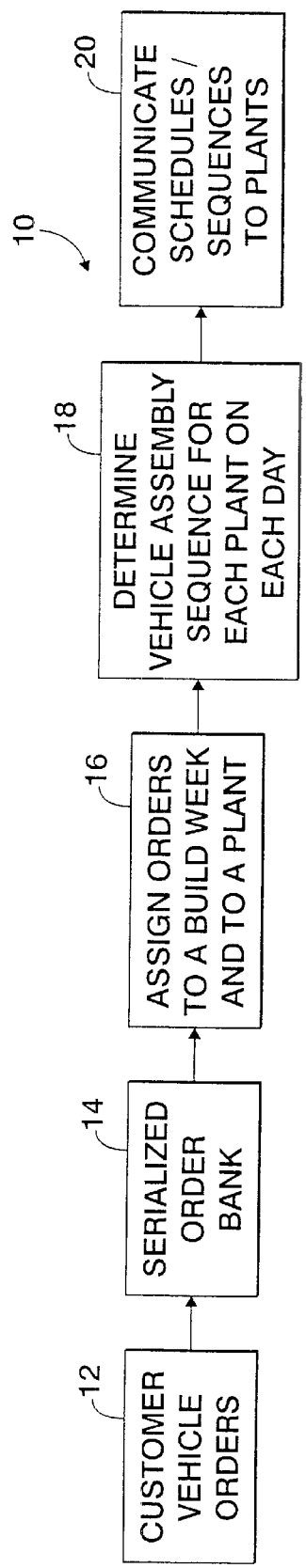
FIG. 1 is a block diagram illustrating the broad methodology of the preferred embodiment of the present invention.

Referring now to FIG. 1, there is shown a methodology 10 for scheduling and sequencing automotive vehicles for manufacture or assembly. Particularly, as explained more fully and completely below, method 10 is effective to determine and provide the best possible sequence in which a number of vehicles can be assembled or manufactured.

In block or step 12, customer and/or dealer vehicle orders are acquired and/or provided. Particularly, orders 12 include information such as the number of vehicles desired, the type (e.g., model) of vehicles desired, the characteristics of the desired or ordered vehicles (e.g., color, interior/upholstery or any other characteristics), and options and/or accessories of the desired or ordered vehicles (e.g., moon-roof, spoiler, traction control systems, power windows, power seats or any other options and/or accessories). In the preferred embodiment of the invention, orders, information, and/or data 12 is compiled, provided and/or stored in an electric/magnetic medium (e.g., upon a computer disk or file), and is transferred, inputted or downloaded in a conventional manner into a serialized order bank or a relational database, as illustrated in block 14. In one non-limiting embodiment, serialized order bank or relational database 14 is resident within a conventional computer system or electronic storage device. In order bank 14, each vehicle that has been ordered is assigned a reference or serial number that is stored within one or more data objects or structures, along with the name/type of the vehicle and the characteristics, options and/or accessories of the vehicle.

In step 16, each of the vehicles or vehicle orders contained within order bank or database 14 is assigned to a particular "build week" (e.g., a week or period of time during which the vehicles will be assembled) and to a particular plant (e.g., a plant or facility in which the vehicles will be assembled). In the preferred embodiment of the invention, the vehicle orders are assigned or arranged into groups based typically upon the type of the vehicle ordered (e.g., certain vehicle models are assigned to specific plants) and the "build week" is based, at least in part, upon the date and/or time at which the vehicle order is received (e.g., earlier vehicle orders are assigned to earlier build weeks).

In one non-limiting embodiment of the invention, the assignment or scheduling of orders to particular build weeks and plants is performed by use of a strategy or algorithm which is embodied within and/or performed by a conventional computer system, apparatus or device. Particularly, the computer system scans the database or order bank 14 for similar model vehicles and groups them together for assembly based upon the da and/or time that the orders were received. In the preferred embodiment of the invention, the computer system displays and/or communicates the build week and plant scheduling information in a textual and/or graphical format on a computer screen, or as a "hard copy", print out or report. The system then saves the information in a separate electronic file for sequencing (i.e., the arrangement of the vehicles into an assembly sequence at each plant on each day). In other alternate embodiments, the assignment or scheduling of orders to a "build week" and a plant is performed manually or in any other suitable manner.

Each "group" of vehicle orders is transferred or communicated to step 18, where each vehicle in the "group" is placed into an assembly sequence.

Particularly, in step 18, all of the vehicles which will be assembled or manufactured in each plant on each day are arranged into an assembly sequence. In the preferred embodiment of the invention, the method, strategy or algorithm for sequencing and scheduling the vehicles is performed by a computer system, apparatus or device which analyzes the data associated with each vehicle in a group and which, based on the analyzed data, arranges the vehicles' in the most efficient assembly sequence.

Figure 2:
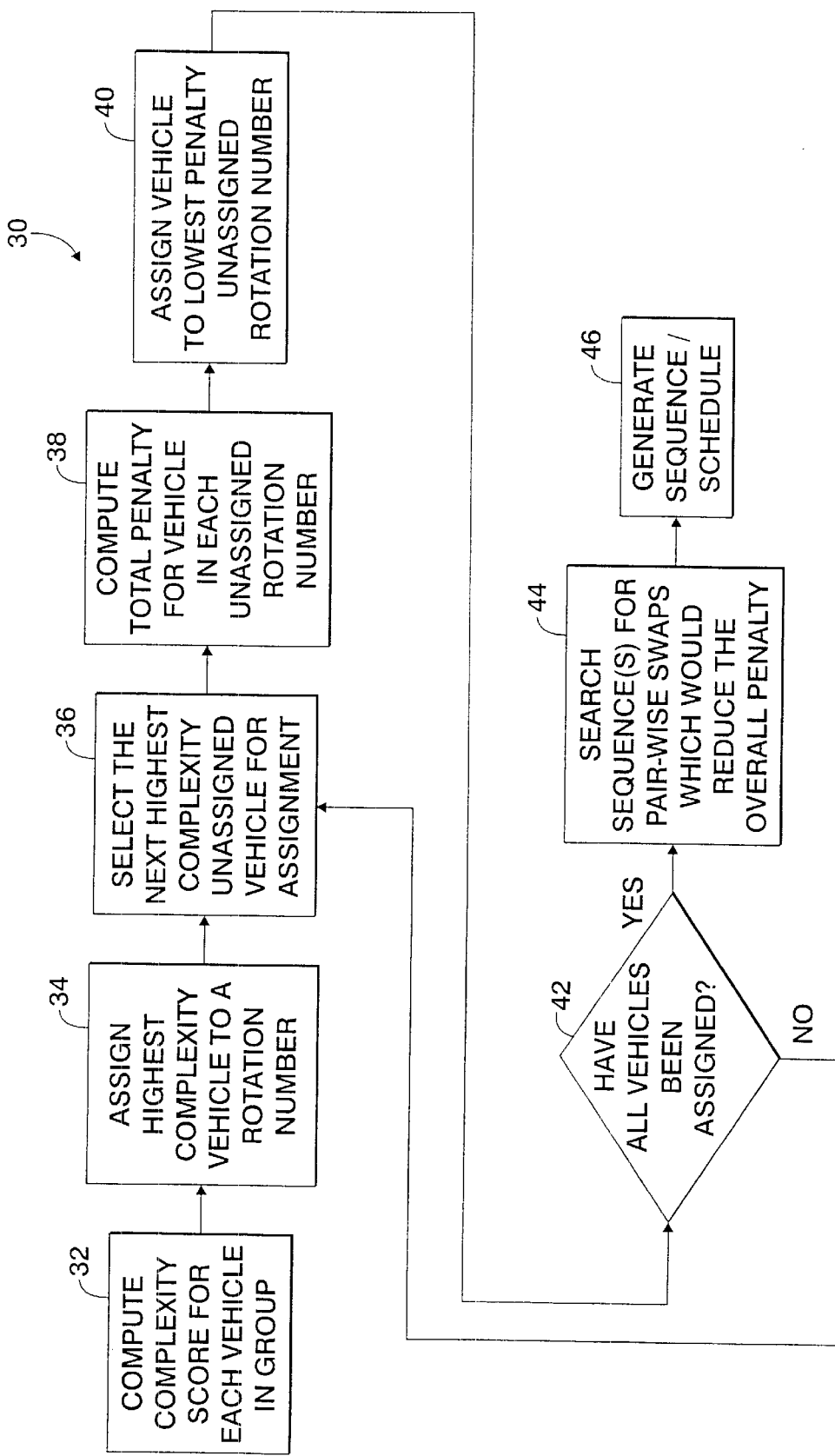
FIG. 2 is a block diagram illustrating the method of sequencing vehicles for manufacture within a plant which is utilized by the methodology shown in FIG. 1.

Referring now to FIG. 2, there is shown a sequencing mood 30 which is performed in accordance with the teachings of the preferred embodiment of the invention. Method 30 utilizes various terms and factors, which are computed and compared, to determine the most efficient sequence for vehicles to be manufactured on a specific day in a specific plant. In the preferred embodiment, the following terms, variables and/or values are utilized by method 30:

Rotation Number/Range: The rotation number is the sequential numbering of "build positions" in the assembly schedule or sequence for a single day. The rotation number can have a value of 1 to the total number of build positions which are present in a single day. The number of build positions will be equal to the total number of vehicles to be assembled in one day when no "skips" are inserted into the schedule.

Skip: A skip is a rotation number that does not have a vehicle assignment. One or more skips will be present when a plant runs a "missing" or empty slot down the final assembly line.

Desired rotation number range: A desired rotation number range is a limit which may be selectively placed on the rotation number range for a particular vehicle. A desired rotation number range will not include the entire range of rotation numbers.

Fixture pattern: The fixture pattern is a list of the valid body styles, which can be assigned to each rotation number.

Valid rotation number: The valid rotation number(s) for each vehicle includes the entire set of possible rotation number assignments that do not violate the fixture pattern.

Hard constraint: A hard constraint is a constraint or rule that may not be violated in a valid assembly sequence. For example and without limitation, the fixture pattern of valid body styles is a hard constraint.

Soft constraint: A soft constraint is a constraint or rule that may be violated in a valid sequence.

For example and without limitation, "option spacing" and "paint blocking", are soft constraints.

Option spacing: Option spacing is equal to a value of one plus the number of vehicles without a specific option which are disposed between two vehicles containing that option.

Paint blocking: Paint blocking is the process of placing units (i.e., vehicles) with the same body or accent paint in adjacent rotation number ranges to reduce the switching of paint colors in painting booths.

User Priority: The user priority is the user selected priority of each sequence constraint (i.e., each hard and soft constraint) based upon the importance of the constraints to the user.

Priority: A priority value is computed for each sequencing constraint (i.e., hard and soft constraints) and is based upon the user priority, (e.g., the priority value is proportional to the relative importance of each option). The priority value is used in the below-described algorithm computations.

Penalty: A penalty value is the sum over all hard and soft constraints of the product of the priority value and an assessment value (e.g., ranging from 0 to 1) of the severity of the violation if a vehicle is assigned to a specific rotation number considering all vehicles in the "neighborhood".

Complexity: A complexity score or value is assigned to each vehicle as an estimate of the relative difficulty of finding a rotation number assignment having a low penalty value.

Hourly counts: The hourly count for a particular option of interest, is the number of vehicles within each production hour that contain that option.

Ideal option spacing: Ideal option spacing is the maximum possible option spacing based on the number of vehicles containing the option and the total number of vehicles in the group.

Neighborhood: A neighborhood is a set of vehicles assigned to rotation numbers which are in close enough proximity to a certain rotation number to cause possible penalties due to a soft constraint. For example and without limitation, the neighborhood for "paint blocking" only contains the one rotation number immediately preceding and the one rotation number immediately following the rotation number of interest. Furthermore, an option with an ideal spacing of five includes the preceding and following five rotation numbers.

Method 30 begins at step 32 where a complexity score or value is computed and assigned for each vehicle order in the group. In the preferred embodiment of the invention, the complexity score for each vehicle is based on the following factors, in order of importance: a desired rotation number range (e.g., it is often beneficial to manufacture "special order" vehicles in a group in a fixed portion of the build schedule to ensure the availability of non-standard materials, equipment and labor); a penalty proportional to the number of valid rotation numbers available for that vehicle, based upon fixture patterns and the body style of the vehicle; and the sum of the priority values for all of the options contained in the vehicle.

In step 34, the vehicle having the highest complexity score or value is assigned to the first position or rotation number in the build sequence which will not cause any hard or soft constraint violation. In step 36, the vehicle having the next highest complexity score or value and which is unassigned is selected for rotation number assignment. The selected vehicle is then communicated to step 38, where the total penalty value for the vehicle is determined in each of the unassigned rotation numbers. In the preferred embodiment of the invention, the vehicle-rotation number penalty is a summation of the following values:

Desired rotation number range penalties: which represents the product of the constraint penalty for assigning a vehicle outside of the desired rotation number range and the distance between the rotation number of interest and the desired range.

Smooth hourly counts penalties: which are computed as the product of the option penalty for each option and the squared difference between actual current hourly count and the ideal hourly count.

Option spacing penalties are computed as the product of the option penalty and one plus the cubed difference between the ideal option spacing and the actual option spacing for all vehicles in the neighborhood containing the option of interest.

Paint blocking penalties are assigned the vehicle in the rotation number of interest does not have the same paint color as the preceding and/or following vehicles.

Close proximity bonus is computed as a small negative value multiplied by the option penalty if the vehicle for assignment and a vehicle assigned at the ideal option spacing away from the rotation number of interest both contain the option.

The method 30 (e.g., the computer system performing method 30) then determines which unassigned rotation number position provides the lowest penalty value, and assigns the vehicle to that position, as illustrated in step 40. In step 42, the method 30 determines whether all the vehicles in the group have been assigned a number. If all the vehicles have not been assigned rotation position numbers, steps 36, 38 and 40 are repeated until all vehicles are assigned. Once all vehicles have been assigned, the resulting sequence is displayed in a textual and/or graphical format (e.g., on a computer screen or as a "hard copy", print out or report). In step 44, method 30 determines whether the resulting sequence can be altered or modified to provide for a more efficient sequencing of the vehicles for manufacture. Particularly, the method 30 (e.g., the computer system performing method 30) "scans" or surveys the present sequence for any pair-wise "swaps" or exchanges which could be made within the sequence which would result in a reduction of the summation of all the penalty values of the vehicles, keeping at any time only one or several different sequences which may have modifications performed on them. If any pair of vehicles could be exchanged or rearranged to lower the overall penalty of the sequence, the rotation positions of those vehicles are switched accordingly. After all pair-wise swaps are completed, in the case of multiple sequences, the optimal sequence is kept and the others discarded.

In step 46, the best manner of sequencing and scheduling vehicles is generated. In step 20 of FIG. 1, the generated sequences or schedules are sent or communicated to the appropriate plants and/or personnel (e.g., the person or persons in charge of the assembly plants or process). In this manner, the present invention provides for the most efficient sequencing and scheduling for vehicles to be manufactured, thereby facilitating the assembly or production process and substantially preventing assembly delays within the process.

It should be understood that Applicant's invention is not limited to the exact methods 10, 30 that are illustrated in FIGS. 1 and 2, but that various changes and/or modifications may be made without departing from the spirit a or the scope of Applicant's invention. For example, in other embodiments of Applicant's invention, additional or different steps and procedures may be undertaken to further maximize the efficiency of the vehicle assembly and/or manufacturing process.

What is claimed is:

1. A method for arranging vehicles in an assembly sequence, said method comprising the steps of:

receiving customer vehicle orders;

assigning a complexity value to each of said received customer vehicle orders, wherein said complexity value is based upon a rotation number range, a penalty value based upon fixture patterns and a body style for each of said received customer vehicle orders, and a sum of priority values for all options contained in each of said received customer vehicle orders;

selecting a first customer vehicle order having a highest assigned complexity value;

selecting a first rotation position within said assembly sequence;

assigning said first customer vehicle order to said first rotation position;

selecting a second customer vehicle order having a second highest assigned complexity value;

computing a plurality of penalty values for said second customer vehicle order in a plurality of unassigned rotation positions within said sequence, wherein said plurality of penalty values comprise a desired rotation number range penalty, a smooth hourly counts penalty, an option spacing penalty, a paint blocking penalty, and a close proximity bonus;

selecting a second rotation position within said assembly sequence having a lowest penalty value for said second customer vehicle order; and assigning said second customer vehicle order to said second rotation position.

2. The method of claim 1 further comprising the steps of:

determining whether all vehicle orders have been assigned;

if all customer vehicle orders have not been assigned, selecting a third customer vehicle order having third highest assigned complexity value;

computing a plurality of second penalty values for said third customer vehicle order in a plurality of second unassigned rotation positions within said sequence;

selecting a third rotation position within said assembly sequence having a lowest penalty value for said third customer vehicle order; and assigning said third customer vehicle order to said third rotation position.

3. The method of claim 2 further comprising the steps of:

searching said sequence for at least one pair-wise exchange of customer vehicle orders which would produce at least one altered sequence having a lower overall penalty value; and altering said sequence by performing said pair-wise exchange of customer vehicle orders to produce a said at least one altered sequence.

4. The method of claim 3 wherein said method is performed by use of a computer system.

5. The method of claim 1 wherein said first rotation position is a position in the build sequence which will not cause any hard or soft constraint violations for assigning the most complex vehicle.

6. A method for scheduling a plurality of vehicles for manufacture, said method comprising the steps of:

assigning a complexity score to each of said plurality of vehicles, wherein said complexity score is based upon a rotation number range, a penalty value based upon fixture patterns and a body style for each of said received customer vehicle orders, and a sum of priority values for all options contained in each of said received customer vehicle orders;

selecting a first vehicle having a highest complexity score;

assigning a first rotation number to said first vehicle;

computing a plurality of penalty scores for each of said plurality of unassigned vehicles in a plurality of unassigned rotation numbers;

assigning each of said plurality of unassigned vehicles to a unique one of said plurality of unassigned rotation numbers having a lowest penalty score, thereby creating an assembly sequence having an overall penalty score;

searching said assembly sequence for pair-wise swaps which would lower said overall penalty score; and performing said pair-wise swaps, thereby lowering said overall penalty score.

7. The method of claim 6 wherein each of said plurality of penalty scores may comprise an option spacing penalty.

8. The method of claim 7 wherein each of said plurality of penalty scores may further comprise a desired rotation number range penalty.

9. The method of claim 8 wherein each of said plurality of penalty scores may further comprise a paint blocking penalty.

10. The method of claim 9 wherein each of said plurality of penalty scores may further comprise a smooth hourly counts penalty.

11. The method of claim 10 wherein each of said plurality of penalty scores may further uprise a close proximity bonus.

* * * * *